(12) United States Patent
Weaver et al.

(10) Patent No.: US 10,160,463 B1
(45) Date of Patent: Dec. 25, 2018

(54) SYSTEM AND METHODS FOR MONITORING DRIVER DISTRACTION

(71) Applicants: David Howard Weaver, Culver City, CA (US); Curtis R. Cosenza, Dayton, OH (US)

(72) Inventors: David Howard Weaver, Culver City, CA (US); Curtis R. Cosenza, Dayton, OH (US)

(73) Assignee: DISTRACTECH, LLC, Oakwood, OH (US)

( * ) Notice: Subject to any disclaimer, the term of this patent is extended or adjusted under 35 U.S.C. 154(b) by 0 days.

(21) Appl. No.: 15/814,939

(22) Filed: Nov. 16, 2017

Related U.S. Application Data

(60) Provisional application No. 62/563,589, filed on Sep. 26, 2017.

(51) Int. Cl.
*B60W 50/14* (2012.01)
*B60W 40/09* (2012.01)
*G07C 5/04* (2006.01)
*H04W 4/04* (2009.01)

(52) U.S. Cl.
CPC ............ *B60W 50/14* (2013.01); *B60W 40/09* (2013.01); *G07C 5/04* (2013.01); *H04W 4/04* (2013.01); *B60W 2050/143* (2013.01)

(58) Field of Classification Search
CPC ...... B60W 50/14; B60W 40/08; B60W 40/09; B60K 35/00; G07C 5/04; G08B 23/00; H04W 8/22; H04W 4/04; H04W 4/16
USPC ......... 340/436, 439, 539.11, 540; 455/414.1, 455/418, 422.1
See application file for complete search history.

(56) References Cited

U.S. PATENT DOCUMENTS

| | | | |
|---|---|---|---|
| 8,526,973 B2 | 9/2013 | Thomson | |
| 8,688,180 B2 | 4/2014 | Catten | |
| 9,324,149 B2 | 4/2016 | Wigton | |
| 9,663,113 B2 | 5/2017 | Catania et al. | |
| 9,796,391 B2* | 10/2017 | Olson | B60K 35/00 |
| 2001/0050614 A1 | 12/2001 | Yang | |
| 2007/0072616 A1 | 3/2007 | Irani | |
| 2008/0319602 A1 | 12/2008 | McClellan | |
| 2010/0130182 A1 | 5/2010 | Rosen | |
| 2010/0131870 A1* | 5/2010 | Park | G06F 3/0481 |
| | | | 715/760 |
| 2011/0298829 A1* | 12/2011 | Stafford | G06K 9/00248 |
| | | | 345/659 |
| 2012/0089442 A1 | 4/2012 | Olsson | |
| 2013/0150004 A1 | 1/2013 | Rosen | |

(Continued)

*Primary Examiner* — Hung T Nguyen
(74) *Attorney, Agent, or Firm* — D. William Graham

(57) ABSTRACT

The present disclosure is related to a method that includes determining that a user of a computer-based device is interacting with a screen of the computer-based device while driving a vehicle. The screen is configured to display a user interface including one or more selectable displayed application pages. Each of the one or more selectable displayed application pages displays one or more visual elements. The method also includes displaying a timer, as a persistent overlay, on at least a portion of each of the one or more selectable displayed application pages. The timer is indicative of a time duration of the user's interaction with the screen while driving. Further, at least one of the visual elements, overlaid by the timer, remains viewable and accessible by the user of the computer-based device.

20 Claims, 13 Drawing Sheets

100

(56) References Cited

U.S. PATENT DOCUMENTS

2014/0016921 A1\* 1/2014 Choi ...................... G03B 17/40
396/264
2015/0266484 A1\* 9/2015 Moran .................. B60W 40/09
340/576
2016/0180677 A1 6/2016 Reed et al.

\* cited by examiner 303
303
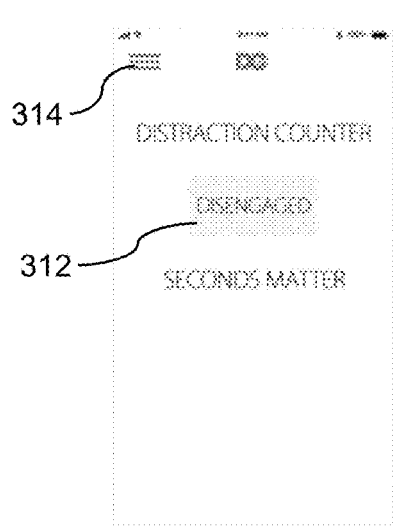
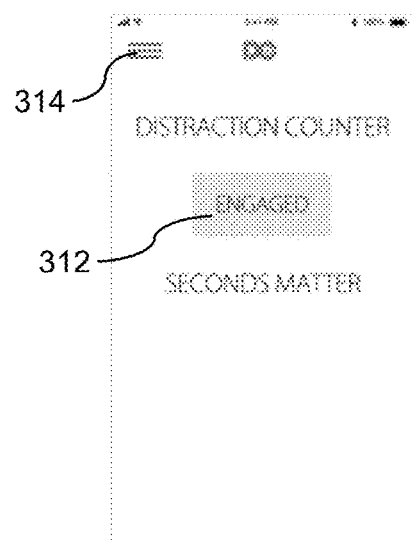
FIG. 3C
FIG. 3D

305

300

307

SYSTEM AND METHODS FOR MONITORING DRIVER DISTRACTION

BACKGROUND

The disclosed subject matter relates to monitoring a user's distraction while driving, and more specifically to systems and methods for monitoring and controlling a user's interaction with a computer-based device while driving a vehicle.

Distracted driving may include any activity that can divert a person's attention away from the primary task of driving. Such distractions may endanger the safety of the driver, the passenger(s), and the bystander(s) by increasing the chances of a motor vehicle collision. Types of distraction include visual distraction, where the driver takes his/her eyes off the road; manual distraction, where the driver takes his/her hands off the steering wheel; and cognitive distraction, where the driver takes his/her mind off from driving. The distractions may be caused by the use of a mobile phone or any other computer-based device while driving. The severity of the distraction may depend on both the level and duration of these distractions, and may be compounded by external factors, such as speed and location of the vehicle and objects in the path of the vehicle.

Therefore, use of computer-based devices (e.g., cell phones) while driving can be distracting and dangerous, even if done occasionally. Unfortunately, despite such dangers, some drivers still use mobile devices while driving.

SUMMARY

Some related arts provide various systems and methods that restrict cell phone usage while driving. Some of these methods often require a separate hardware component to be installed on the vehicle. Yet other methods require a mobile phone to monitor vehicle speed via Global Positioning Satellite (GPS) information and automatically shut down the phone when the vehicle is traveling at a high speed. However, such methods are unable to distinguish between a driver and passenger. Moreover, such methods may completely shut down the phone and prevent the user from accessing some basic applications, such as navigation.

It may therefore be beneficial to provide systems and methods for monitoring and controlling a user's interaction with a computer-based device. Specifically, it may be beneficial to provide a timer on a screen of the computer-based device to indicate a duration of a user's interaction with the computer-based device while driving. The timer may be incremented in real-time.

It may further be beneficial to provide systems and methods which monitor a user's interaction with a screen of a computer-based device, while driving, without preventing the user from accessing some basic applications or services of the computer-based device, such as navigation, emergency calling and/or emergency texting.

It may also be beneficial to notify a user using visual and audio alerts if the user's duration of interaction with the computer-based device, while driving, exceeds a predetermined threshold.

Some embodiments are directed to a method that includes determining, by using one or more sensors, that a user of a computer-based device is interacting with a screen of the computer-based device while driving a vehicle. In the instant invention, 'interacting with the screen" can include physical touching of the screen or facial recognition by the computer based device that the user is interacting with the screen. The screen is configured to display a user interface including one or more selectable displayed application pages. Each of the one or more selectable displayed application pages displays one or more visual elements. The method also includes displaying a timer, as a persistent overlay, on at least a portion of each of the one or more selectable displayed application pages. The timer is indicative of a time duration of the user's interaction with the screen while driving. Further, at least one of the visual elements, overlaid by the timer, remains viewable and accessible by the user of the computer-based device.

Some other embodiments are directed to a method that includes providing an application for installation on a computer-based device including a screen and a processor. The screen is configured to display a user interface including one or more selectable displayed application pages. Each of the one or more selectable pages displays one or more visual elements. The application includes computer-readable instructions, which upon execution, cause the processor to determine, by using one or more sensors, that a user of the computer-based device is interacting with the screen of the computer-based device while driving a vehicle. The computer-readable instructions further cause the processor to display a timer, as a persistent overlay, on at least a portion of each of the one or more selectable displayed applications on the screen. The timer is indicative of a time duration of the user's interaction with the screen while driving. Further, at least one of the visual elements, overlaid by the timer, remains viewable and accessible by the user of the computer-based device.

Yet other embodiments are directed to a computer-based device including a screen configured to display a user interface including one or more selectable displayed applications on the screen. Each of the one or more selectable displayed applications on the screen displays one or more visual elements. The computer-based device also includes a memory that stores computer-readable instructions. The computer-based device further includes a processor configured to execute the computer-readable instructions to determine, by using one or more sensors, that a user of the computer-based device is interacting with the screen of the computer-based device while driving a vehicle. The processor is further configured to display a timer, as a persistent overlay, on at least a portion of each of the one or more selectable displayed applications on the screen. The timer is indicative of a time duration of the user's interaction with the screen while driving. Further, at least one of the visual elements, overlaid by the timer, remains viewable and accessible by the user of the computer-based device.

BRIEF DESCRIPTION OF DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures:

FIGS. 3A-3I illustrate various views of a user interface displayed on a computer-based device in accordance with the disclosed subject matter.

DETAILED DESCRIPTION OF EXEMPLARY EMBODIMENTS

Figure 1:
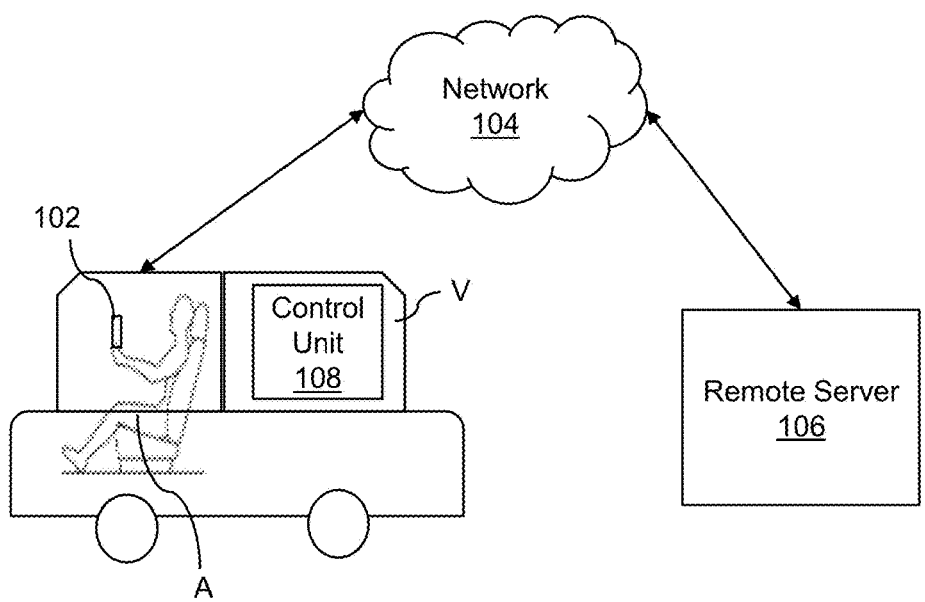
FIG. 1 illustrates an exemplary system in accordance with the disclosed subject matter.

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

In present disclosure, the term "persistent overlay" may refer to visual information overlaid on a user interface of a computer-based device. The persistent overlay may allow at least some of the presented visual information overlaid by the persistent overlay to remain viewable and accessible by a user. The persistent overlay can be presented at a subsequently presented displayed applications page on the screen of the user interface that allows at least some of the overlaid visual information to remain viewable and accessible.

In some embodiments, the persistent overlay may be rendered translucent, or semi-transparent, so as not to completely obscure the overlaid visual information. In this way, the persistent overlay can remain viewable and yet unobtrusive.

The term "selectable displayed application pages on the screen" may refer to pages of a user interface that can be selected by a user for display on a screen of a computer-based device. For example, the user may perform a swiping action on the screen of the computer-based device to navigate between the selectable displayed applications pages on the screen.

The present disclosure is related to systems and methods for monitoring a user's interaction with a computer-based device while driving a vehicle. The computer-based device may include, but is not limited to, a smartphone, a cell phone, a tablet, a Personal Computer (PC), a gaming device, a portable media player, an automobile computer system, an Internet enabled Television (TV), and so forth.

In some embodiments, the computer-based device includes a screen, a memory and a processor. In an exemplary embodiment, the screen may be a touchscreen display. The touchscreen may be a capacitive touchscreen or a resistive touchscreen. In an exemplary embodiment, the screen may include a touch sensitive layer to receive an input from the user. In some embodiments, the screen is configured to display a user interface including one or more selectable displayed application pages on the screen on the screen to the user. In an embodiment, the screen may display only one of the selectable pages at a single instance. In some embodiments, the user may select at least one of the selectable application pages to be displayed on the screen. In one embodiment, the user may swipe through the one or more selectable displayed application pages to select one of the selectable displayed application pages to be displayed on the screen. In another embodiment, the screen may simultaneously display at least portions of two or more selectable displayed application pages. The computer-based device may allow the user to select one of the selectable displayed application pages via the touch sensitive layer. Each of the one or more selectable displayed application pages displays one or more visual elements. The one or more visual elements may include display elements, such as, but not limited to, icons, folders, videos, images, a wallpaper and so forth. In some embodiments, the user may access the visual elements via the touch sensitive layer of the screen. In an embodiment, the user may select at least one of the visual element to perform one or more operations on the computer-based device.

In an exemplary embodiment, the memory may store at least one application.

The application may include computer-readable instructions, which upon execution, may perform one or more operations on the computer-based device. In some embodiments, the memory may include dynamic memory (e.g., Random Access Memory, magnetic disk, writable optical disk, etc.) and/or static memory (e.g., Read Only Memory, Compact Disc-Read Only Memory, etc.).

In an exemplary embodiment, the processor of the computer-based device may execute the computer-readable instructions stored in the memory to perform the one or more operations on the computer-based device. In some embodiments, the processor may be communicably coupled to one or more sensors. The one or more sensors may include, but not limited to, a magnetometer and GPS, gyroscope, accelerometer, proximity, sensor, barometer, ambient light sensor, microphone, multiple cameras, temperature, wifi, Bluetooth, a camera, a motion sensor, an orientation sensor, a proximity sensor, a position sensor and so forth. In some embodiments, the one or more sensors may be disposed within the computer-based device and directly connected to the processor. In some other embodiments, the one or more sensors may be disposed in the vehicle and may be communicably coupled to the processor via a control unit.

In an exemplary embodiment, the processor executes the computer-readable instructions to determine that the user of the computer-based device is driving a vehicle while interacting with the screen of the computer-based device. In some embodiments, the processor may receive input signals from the one or more sensors to determine that the user of the computer-based device is driving a vehicle. In some embodiments, the one or more sensors may include one or more vehicle sensors configured to determine various parameters such as, but not limited to, seat occupancy, number of passengers, driving velocity, and so forth. In an embodiment, the processor may combine the input signals received from the one or more sensors to determine various parameters, for example, but not limited to, a status of the vehicle, a status of the user, and a probability that the user is driving the vehicle. In an embodiment, the processor may determine that the user is driving the vehicle if the probability exceeds a predetermined threshold.

In an exemplary embodiment, the processor further determines that the user is interacting with the screen of the computer-based device while driving the vehicle using the one or more sensors. In one embodiment, the processor may receive input signals from the touch sensitive layer incorporated in the screen to determine that the user is interacting with the screen. In some embodiments, the processor may combine the input signals or data received from the one or more sensors to determine that the user is interacting with the screen while driving the vehicle.

In an exemplary embodiment, the processor may further execute the computer-readable instructions stored in the memory to display a timer on the screen upon determining that the user is interacting with the screen while driving a vehicle. In an embodiment, the timer is displayed on at least a portion of each of the one or more selectable displayed application pages. The timer may be displayed as a persistent overlay on the user interface displayed on the screen. In some embodiments, the processor may determine the portion of each of the one or more selectable displayed application pages that is used for displaying the timer based on the visual elements presented on each of the one or more selectable displayed application pages. Further, the timer may be an indicative of a duration of the user's interaction with the screen while driving. In some embodiments, the timer may overlay at least one visual element of each of the one or more selectable displayed application pages. In an exemplary embodiment, the at least one visual element, overlaid by the timer, remains viewable and accessible by the user of the computer-based device. For example, the user can select an icon, overlaid by the timer, in order to access an application installed on the computer-based device. In some embodiments, the icon, overlaid by the timer, may be at least partially visible to the user. The processor may allow the user to select the icon, overlaid by the timer, by any selection methods such as, but not limited to, tapping, clicking and so forth. The user may also be able to perform various operations on the portion of the page overlaid by the timer. Such operations may include touch operations, for example, tapping, pinching, swiping, and so forth. Further, such operations may allow the user to change various properties of the displayed application page such as, but not limited, shape, size, brightness and so forth.

FIG. 1 illustrates a system 100 in accordance with the disclosed subject matter.

The system 100 implements various methods for monitoring and reducing a driver's distraction while driving.

The system 100 includes a computer-based device 102, a network 104 and a remote server 106. Further, a user "A", sitting in a vehicle "V", uses the computer-based device 102 to perform various tasks. In an exemplary embodiment, the system 100 may monitor a distraction of the user "A" when the user "A" is the driver of the vehicle "V". The tasks may include, but not limited to, calling, texting, navigation and so forth. Example of the vehicle "V" may include, but not limited to, a wagon, a bicycle, a motor vehicle (e.g., a motorcycle, a car, a truck, a bus etc.), a rail transport vehicle (e.g., a train, a tram etc.), a watercraft (e.g., a ship, a boat etc.), an aircraft, and so forth. In some embodiments, the computer-based device 102 may include, but is not limited to, a smartphone, a cell phone, a tablet, a Personal Computer (PC), a gaming device, a portable media player, an automobile computer system, an Internet enabled Television (TV), and so forth. In an embodiment, the computer-based device 102 may be powered by an onboard energy source, such as a battery.

The computer-based device 102 includes a screen (not shown in FIG. 1) configured to display a user interface. The screen may include any display device such as, but not limited to, a Cathode Ray Tube (CRT) display, a Liquid Crystal Display (LCD), a Light Emitting Diode (LED) display, and the like. In an exemplary embodiment, the screen may be a touchscreen display. The touchscreen display may be a capacitive touchscreen or a resistive touchscreen. Embodiments are intended to include or otherwise cover any type of screen, including known, related art, and/or later developed technologies.

In some embodiments, the user "A" may interact with the computer-based device 102 via a user interface displayed on the screen. In some embodiments, the user interface may include one or more selectable displayed application pages. Each of the selectable displayed application pages displays one or more visual elements. The one or more visual elements may include display elements, such as, but not limited to, icons, folders, videos, images, wallpapers and so forth. In some embodiments, the screen may be configured to display only one selectable displayed application page at a time. In another embodiment, the screen may simultaneously display at least portions of two or more selectable displayed application pages.

The computer-based device 102 also includes a memory (not shown in FIG. 1) that stores computer-readable instructions. The computer-readable instructions, upon execution, are configured to perform one or more operations on the computer-based device 102. In an exemplary embodiment, the memory may support the installation of an application including the computer-based instructions on the computer-based device 102. The memory may include dynamic memory (e.g., Random Access Memory, magnetic disk, writable optical disk, etc.) and/or static memory (e.g., Read Only Memory, Compact Disc-Read Only Memory, etc.) for storing the computer-readable instructions. In an embodiment, the memory may store data associated with or generated by the application installed on the computer-based device 102.

In some embodiments, the computer-based device 102 also includes a processor (not shown in FIG. 1) disposed in communication with the memory and the screen. The processor may include any processing device such as, but not restricted to, a Central Processing Unit (CPU), a microprocessor, or a microcontroller. In some embodiments, the processor may execute the computer-readable instructions stored in the memory. In an embodiment, the processor may execute the computer-readable instructions to determine that the user "A" is interacting with the screen of the computer-based device 102 while driving the vehicle "V".

In an exemplary embodiment, the processor may communicate with one or more sensors (not shown in FIG. 1) to determine that the user "A" is interacting with the screen of the computer-based device 102 while driving the vehicle "V". The one or more sensors may include, but not limited to, a camera, an accelerometer, a gyroscope, a compass, a barometer, an infrared sensor and so forth. In some embodiments, the one or more sensors may include one or more device sensors which are disposed within the computer-based device 102 and directly connected to the processor. In some other embodiments, the one or more sensors may include one or more vehicle sensors which are disposed in the vehicle "V" and may be communicably coupled to the processor via a control unit 108.

In some embodiments, the processor may receive input signals from the touch sensitive layer incorporated within the screen to determine that the user "A" is interacting with the screen while driving the vehicle "V". In some other embodiments, the processor may receive input signals from a camera to determine that the user "A" is interacting with the screen while driving the vehicle "V". In an embodiment, the camera may be a part of the computer-based device 102. In an alternative embodiment, the camera may be a part of the vehicle "V". In further embodiments, the processor may receive input signals from a navigation system installed on the computer-based device 102 or the vehicle "V". In some other embodiments, the processor may receive input signals from a Bluetooth™ device incorporated within the computer-based device 102 to determine the user's interaction with the screen while driving. In yet another embodiment, the processor may determine an active communication channel associated with the computer-based device 102 to determine the user's interaction with the screen. For example, any active communication channel established by the processor may indicate that the user is interacting with one or more applications installed on the computer-based device 102. Such applications may include, but not limited to, video calling application, audio calling application, messaging application and so forth.

In some other embodiments, the processor may receive input signals from an orientation sensor of the computer-based device 102 to determine that the user "A" is interacting with the screen. The orientation sensor may be an accelerometer, a gyroscope, a compass and so forth. In some embodiments, the processor may receive input signals from a proximity sensor of the computer-based device 102 to determine that the user "A" is interacting with the screen. The proximity sensor may be a capacitive sensor, an inductive sensor, a magnetic sensor, an optical sensor, and so forth. The proximity sensor may detect a proximity between the user "A" and the computer-based device 102. The processor may also determine active applications (e.g., calling, texting, or audio/video playback applications), running on the computer-based device 102, to determine the user's interaction with the screen. In an exemplary embodiment, the processor may combine various input signals and data received from the one or more sensors to determine that the user "A" is interacting with the screen of the computer-based device 102 while driving the vehicle "V".

The processor may also execute the computer-readable instructions to display a timer on at least a portion of each of the selectable displayed application pages of the user interface. In an exemplary embodiment, the processor may display the timer upon determining that the user "A" is interacting with the screen of the computer-based device 102 while driving the vehicle "V". In some embodiments, the timer may be indicative of a time duration of interaction of the user "A" with the screen of the computer-based device 102. The timer may be displayed as a persistent overlay over each of the one or more selectable displayed application displayed application pages. In some embodiments, the timer may overlay at least one visual element of a selectable displayed application page. In an exemplary embodiment, the at least one visual element, overlaid by the timer, remains viewable and accessible by the user "A". For example, the user "A" can view and access an icon of an application overlaid by the timer.

In some embodiments, the processor may optionally vary a display size of the timer based on the one or more visual elements displayed on the user interface. The processor may vary the display size of the timer based on at least one visual element that is overlaid by the timer. In an example, the processor may optionally increase the display size of the timer in case a static wallpaper is displayed on a home screen or displayed application page. In another example, the processor may decrease the display size of the timer in case an icon, an image or a video is displayed on the screen. In alternative embodiments, the processor may receive an input from the user "A" to change the display size of the timer. In an embodiment, the user "A" may provide the input to the processor via an input device such as, but not limited to, a mouse, a button, a microphone, a camera and the touch sensitive layer of the screen.

In some embodiments, the processor may vary a display transparency of the timer based on the one or more visual elements displayed on the user interface. In some other embodiments, the processor may vary the display transparency based on a brightness value of the screen. In some other embodiments, the processor may receive an input from the user "A" to change the display transparency of the timer.

In some embodiments, the processor may reset and hide the timer upon determining that the vehicle "V" has stopped moving. In some embodiments, the processor may determine that the vehicle "V" has stopped moving based on signals receive from the control unit 108. In some other embodiments, the processor may determine a state of the vehicle "V" based on the input signals received from the one or more sensors. In another embodiment, the processor may reset and hide the timer upon determining that the user "A" has stopped interacting with the screen for a first predefined time duration. In some embodiments, the first predefined duration may be automatically defined by the processor based on the computer-readable instructions. In other embodiments, the first predefined time duration may be preselected by the user "A". The predefined time duration may be stored in the memory by the processor.

In some embodiments, the processor may receive time signals from a timing circuit (not shown) to display and update the timer on the user interface of the screen. In an embodiment, the processor may receive the time signals at varying time intervals. The processor may change or update the timer displayed on the user interface based on the received time signals. In some embodiments, the time intervals are varied based on the duration of the user's interaction with the screen. In an embodiment, the processor may increase the time intervals as the duration of the user's interaction with the screen approaches a predefined threshold. The predefined threshold may be a maximum time duration that the user "A" is allowed to interact with the screen of the computer-based device 102 while driving.

In an embodiment, the processor may optionally also execute the computer-readable instructions to generate an audio alert upon determining that the user "A" is interacting with the screen while driving the vehicle "V". In some embodiments, the processor may generate a continuous audio alert signal indicative of the user's interaction with the screen. In some embodiments, the processor may vary a pitch and an amplitude associated with the sound alert as the duration of interaction approaches the predefined threshold. For example, the processor may gradually increase the pitch and/or the amplitude of the sound alert as the duration of interaction approaches the predefined threshold.

In some embodiments, the control unit 108 may include a processing device such as, but not restricted to, a Central Processing Unit (CPU), a microprocessor, or a microcontroller. The control unit 108 may be communicably coupled to the processor. In some embodiments, the control unit 108 may receive input signals from one or more vehicle sensors (not shown) disposed in the vehicle "V". The control unit 108 may transmit the input signals received from the one or more vehicle sensors to the processor of the computer-based device 102.

In an exemplary embodiment, the computer-based device 102 may be communicably coupled to the remote server 106 via the network 104. The network 104 may include a data network such as, but not restricted to, the Internet, Local Area Network (LAN), Wide Area Network (WAN), Metropolitan Area Network (MAN), etc. In certain embodiments, the network 104 can include a wireless network, such as, but not restricted to, a cellular network and may employ various technologies including Enhanced Data rates for Global Evolution (EDGE), General Packet Radio Service (GPRS), Global System for Mobile communications (GSM), Internet protocol Multimedia Subsystem (IMS), Universal Mobile Telecommunications System (UMTS) etc. In some embodiments, the network 104 may include or otherwise cover networks or subnetworks, each of which may include, for example, a wired or wireless data pathway. The network 104 may include a circuit-switched voice network, a packet-switched data network, or any other network capable for carrying electronic communications. For example, the network 104 may include networks based on the Internet Protocol (IP) or Asynchronous Transfer Mode (ATM), and may support voice usage, for example, Voice over Internet Protocol (VoIP), Voice-over-ATM, or other comparable protocols used for voice data communications. In one implementation, the network 104 includes a cellular telephone network configured to enable exchange of text or Short Message Service (SMS) messages.

Examples of the network 104 may further include, but are not limited to, a Personal Area Network (PAN), a Storage Area Network (SAN), a Home Area Network (HAN), a Campus Area Network (CAN), a Local Area Network (LAN), a Wide Area Network (WAN), a Metropolitan Area Network (MAN), a Virtual Private Network (VPN), an Enterprise Private Network (EPN), Internet, a Global Area Network (GAN), and so forth. Embodiments are intended to include or otherwise cover any type of network, including known, related art, and/or later developed technologies to connect the remote server 106 and the computer-based device 102.

In some embodiments, the processor may transmit user data to one or more remote servers. In an exemplary embodiment, the processor may transmit the user data to the remote server 106 (interchangeably referred to as "the server 106"). The user data may include information indicative of at least the time duration of the user's interaction with the screen while driving. In some embodiments, the user data may include the input signals received by the processor from the one or more sensors. In some other embodiments, the user data may also include various parameters determined by the processor. In an embodiment, the remote server 106 can be a computer program or a device that provides functionality for other programs or devices. In some other embodiments, the remote server 106 may be a computational device, wherein a single computation may be distributed across multiple processes or devices. The remote server 106 may provide various functionalities, often called "services", such as sharing data or resources among multiple clients, or performing computation. A single server can serve multiple devices, and a single device can use multiple servers. In an exemplary embodiment, the server 106 may be any type of server, such as, but not limited to, a database server, a file server, a mail server, a print server, a game server, a web server, and an application server. In some embodiments, the server 106 may also include a cluster of servers.

In some embodiments, the server 106 may be a cloud server. In an exemplary embodiment, the server 106 is used to monitor and control the user's interaction with the computer-based device 102 while driving the vehicle "V". In an exemplary embodiment, the server 106 may receive the user data from the processor of the computer-based device 102. In an embodiment, the server 106 or the computer-based device 102 may enable an event logging mode. Once the event logging mode is enabled, the input signals or data from the one or more sensors may be processed in real-time to monitor movement of the computer-based device 102 indicative of the computer-based device 102 being located in a moving vehicle. In an embodiment, the event logging mode may use a low power sensor to conserve battery usage of the computer-based device 102.

In some embodiments, the server 106 may perform one or more operations on the computer-based device 102 based on the user data received from the computer-based device 102. In an embodiment, the server 106 may activate a mode on the computer-based device 102 based on the time duration of the user's interaction with the screen while driving. The mode may include a count mode, and optionally at least one of a lock mode and a freeze mode. During the count mode, the server 106 may continue displaying the timer on the screen while the user "A" interacts with the screen.

During the lock mode, the server 106 may lock the screen to prevent the user "A" from interacting with the screen. In some embodiments, the server 106 may unlock the screen upon determining that the vehicle "V" has stopped moving. Further, during the lock mode, the server 106 may provide the user "A" with an access to at least one of a navigation feature, an emergency call feature or an emergency texting feature of the computer-based device 102. In some other embodiments, the server 106 may unlock the screen upon receiving an override input from the user "A". In an embodiment, the override input may in form of an audio signal or a gesture.

During the freeze mode, the server 106 may freeze the screen for a second predefined time duration. In some embodiments, the processor may unfreeze the screen after the second predefined time duration has lapsed.

In alternative embodiments, the processor may activate one of the modes on the computer-based device 102 based on the user data. In some other embodiments, the processor may be select the mode based on a preset preference. In some embodiments, the preset preference may be defined by the user "A".

Figure 2:
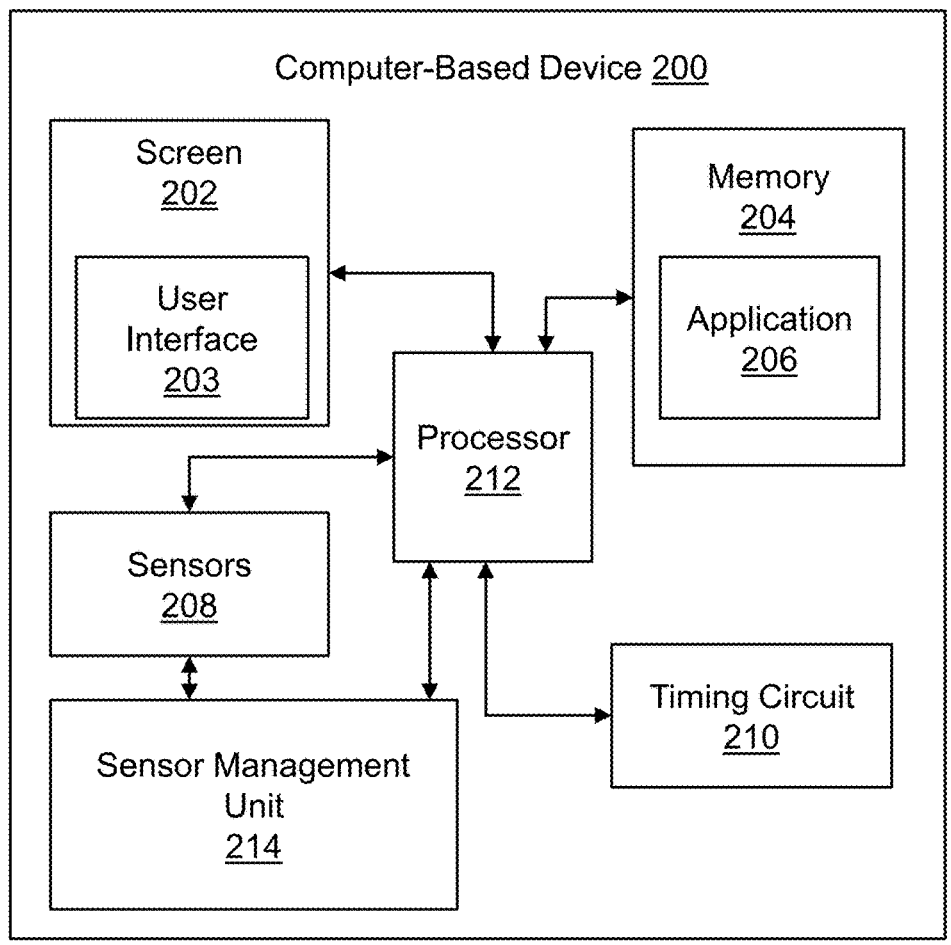
FIG. 2 illustrates a computer-based device in accordance with the disclosed subject matter.

FIG. 2 illustrates a block diagram of a computer-based device 200 in accordance with an embodiment of present disclosure. The computer-based device 200 includes a screen 202, a memory 204, one or more sensors 208, a timing circuit 210 and a processor 212. In an embodiment, the computer-based device 200 may be powered by an onboard energy source, such as a battery.

The screen 202 may allow a user to interact with the computer-based device 200 via a user interface 203. In an exemplary embodiment, the screen 202 may be configured to display the user interface 203 including one or more selectable displayed application pages. The one or more selectable pages may include a home page, a lock page, an application page and so forth. Each of the one or more selectable pages includes one or more visual elements. The one or more visual elements may include icons, texts, images, videos and so forth. In an exemplary embodiment, the visual element may be an icon configured to open a corresponding application. In some embodiments, the screen 202 may include any display device such as, but not limited to, a Cathode Ray Tube (CRT) display, a Liquid Crystal Display (LCD), a Light Emitting Diode (LED) display, and the like. In an exemplary embodiment, the screen 202 may a touch enabled display, such as a capacitive screen or a resistive screen. Embodiments are intended to include or otherwise cover any type of display, including known, related art, and/or later developed technologies.

The memory 204 is configured to stored computer-readable instructions. In some embodiments, the memory 204 may be configured to store an application 206. In some embodiments, the application 206 may be a software package, a web application, a service program and so forth. The application 206 may be installed on the computer-based device 200. Further, the application 206 includes the computer-readable instructions or code, that upon execution by the processor 212, enables the computer-based device 200 to perform various functions. In an exemplary embodiment, the application 206 may run as a service which remains active in background. In an embodiment, the application 206 may remain active in a waiting mode that consumes less power. The waiting mode may help conserve power of the energy source of the computer-based device 200. Upon determining that the user is driving the vehicle, the application 206 may enter an aware mode. During the aware mode, the processor 212 may receive input signals from the one or more sensors 208 to determine whether the user is interacting with the screen or not. Further, the application 206 enters a count mode upon determining that the user is interacting with the screen while driving. During the count mode, a timer or counter is displayed on the screen 202. The processor 212 increments the timer based on the duration of the user's interaction with the screen while driving.

In an embodiment, the memory 204 may also store data associated with or generated by the application 206. In some other embodiments, the memory 204 may be configured to store output data generated by the one or more sensors 208. Examples of the memory 204 may include, but not limited to, a Read Only Memory (ROM), a Random Access Memory (RAM), a Compact Disc-Read Only Memory (CD-ROM), magnetic tape, optical data storage devices, and so forth. Embodiments are intended to include or otherwise cover any type of memory configured to store computer-readable instruction, including known, related art, and/or later developed technologies.

In some embodiments, the one or more sensors 208 may be configured to detect events or changes in the environment. In some other embodiments, the one or more sensors 208 may detect or measure a physical property associated with a device or a user. In an exemplary embodiment, the one or more sensors 208 may record an event or a physical property and transmit it to the processor 212. The one or more sensors 208 may include a camera, a motion sensor, a proximity sensor, an orientation sensor, a touch sensitive layer or a position sensor. Example of the one or more sensors 208 further includes an Iris sensor, a pressure sensor, an accelerometer, a barometer, a fingerprint sensor, a gyro sensor, a geomagnetic sensor, a hall sensor, a proximity sensor, a RGB light sensor, a Global Positioning System (GPS) sensor and so forth.

In some embodiments, the computer-based device 200 includes the timing circuit 210 to generate a time signal. In an exemplary embodiment, the time signal may be indicative a time duration of the user's interaction with the screen 202. In some embodiments, the timing circuit 210 may be an Integrated Circuit (IC) including various electronic components such as, but not limited to, resistors, capacitors, operational amplifiers (OP-AMPs) and so forth.

In an exemplary embodiment, the processor 212 may be communicably coupled to the screen 202, the memory 204, the one or more sensors 208 and the timing circuit 210. In an exemplary embodiment, the processor 212 may execute the computer-readable instructions stored in the memory 204 to perform a set of operations. In some embodiments, the computer-readable instructions may be written in a computer programming language that is compiled into a native instruction set of the processor 212. In some other embodiments, the computer-readable instructions may be written directly using the native instruction set (e.g., machine language) of the processor 212. In some embodiments, the processor 212 may execute the computer-readable instructions to determine that a user of the computer-based device 200 is interacting with the screen 202 while driving a vehicle. The processor 212 may determine that the user is interacting with the screen 202 while driving by using the one or more sensors 208. In an embodiment, the processor 212 may receive input signals from the one or more sensors 208 to determine that the user is driving a vehicle.

In some embodiments, the processor 212 may include a sensor management unit 214. The sensor management unit 214 may include software and/or hardware for carrying out various operations. The sensor management unit 214 may determine which sensors are available for the processor 212 to determine that the user is driving the vehicle. In some other embodiments, the sensor management unit 214 may determine a sensor's capability based on various parameters such as, but not limited to, maximum and minimum ranges, manufacturers, power requirements, and resolutions. In some embodiments, the sensor management unit 214 may acquire raw sensor data from the one or more sensors 208. The sensor management unit 214 may process the raw data received from the one or more sensors 208 and then transmit the processed data to the processor 212. In an embodiment, the sensor management unit 214 may periodically acquire sensor data from the one or more sensors 208 at a predefined rate. In some embodiments, the sensor management unit 214 may register or store an event based on the sensor data or input signals received from the one or more sensors 208. In some other embodiments, the sensor management unit 214 may unregister the event after an operation is performed based on the sensor data received from the one or more sensors 208.

In an embodiment, the sensor management unit 214 may be a programmable logic device including one or more logic gates for processing the sensor data received from the one or more sensors 208.

In alternative embodiments, the processor 212 may directly receive input signals from the one or more sensors 208. In an embodiment, the processor 212 may receive input signals from a camera to determine that the user is seated in a driver's seat. In some embodiments, the processor 212 may receive input signals from a position sensor, such as a Global Positioning System (GPS) sensor, to determine that the vehicle is in motion. In further embodiments, the processor 212 may utilize a Bluetooth™ device to determine that the user is driving the vehicle. In some embodiments, the processor 212 may check the applications running on the computer-based device 200 to determine that the user is driving a vehicle. In some other embodiments, the processor 212 may determine that a user of the computer-based device 200 is driving a vehicle based on data signals received from an external system (e.g., a car manufacturer, another vehicle, a traffic monitoring system etc.).

In an embodiment, the processor 212 may check an active Bluetooth™ and/or WiFi connection to determine that the user is interacting with the screen 202. In another embodiment, the processor 212 may check active applications on the computer-based device 200 to determine that the user is interacting with the screen 202. In some other embodiments, the processor 212 may receive input signals from an orientation sensor to determine that the user is interacting with the screen 202. In alternative embodiments, the processor 212 may receive input signals from the touch sensitive layer incorporated in the screen 202 to determine the user's interaction with the screen 202. In some embodiments, the processor 212 may combine the input signals or data received from the one or more sensors 208 to determine the user's interaction with the screen 202 while driving the vehicle. In an exemplary embodiment, the processor 212 may activate a User Driving Mode (UDM) on the computer-based device 200 upon determining that the user of the computer-based device 200 is interacting with the screen 202 while driving a vehicle. During the UDM, the processor 212 may continuously monitor the user's interaction with the screen 202 via the application 206.

In some embodiments, the processor 212 may execute the computer-readable instructions to display a timer on the screen 202 upon determining that the user is interacting with the screen 202 while driving. In an exemplary embodiment, the processor 212 may execute the computer-readable instructions of the application 206 to display a timer on the screen 202. In some embodiments, the timer may be displayed on at least a portion of each of the selectable displayed application pages of the user interface 203. In some embodiments, the timer may be indicative a time duration of the user's interaction with the screen 202 of the computer-based device 200. The timer may be displayed as a persistent overlay over the one or more selectable displayed application pages. In some embodiments, the timer may overlay at least one visual element of a selectable displayed application page. In an exemplary embodiment, the at least one visual element, overlaid by the timer, remains viewable and accessible by the user. For example, the user can view and access an icon of an application overlaid by the timer.

In some embodiments, the processor 212 may optionally vary a display size of the timer based on the one or more visual elements displayed on the user interface 203. The processor 212 may vary the display size of the timer based on at least one visual element displayed on the screen 202. In an example, the processor 212 may increase the display size of the timer in case a static wallpaper is displayed on a home screen. In another example, the processor 212 may decrease the display size of the timer in case an icon or a video is displayed on the screen 202. In alternative embodiments, the processor 212 may receive an input from the user to change the display size of the timer. In an embodiment, the user may provide the input to the processor 212 via an input device (not shown) such as, but not limited to, a mouse, a button, a microphone, a camera, and the touch sensitive layer of the screen 202.

In some embodiments, the processor 212 may vary a display transparency of the timer based on the one or more visual elements displayed on the user interface 203. In some other embodiments, the processor 212 may vary the display transparency based on a brightness value of the screen 202. In some other embodiments, the processor 212 may receive an input from the user to change the display transparency of the timer.

In some embodiments, the processor 212 may reset and hide the timer upon determining that the vehicle has stopped moving. In some embodiments, the processor 212 may determine that the vehicle has stopped moving based on signals receive from the control unit 108 (shown in FIG. 1). In some other embodiments, the processor 212 may determine a state of a vehicle based on the input signals received from the one or more sensors 208. In another embodiment, the processor 212 may reset and hide the timer upon determining that the user has stopped interacting with the screen 202 for a first predefined time duration. In some embodiments, the first predefined duration may be selected by the processor 212. In some other embodiments, the first predefined duration may be preselected by the user. The predefined time duration may be stored in the memory 204 by the processor 212.

In some embodiments, the processor 212 may receive time signals from the timing circuit 210 to display the timer on the user interface 203 of the screen 202. In an embodiment, the processor 212 may receive the time signals from the timing circuit 210 at varying time intervals. The processor 212 may change the timer displayed on the user interface 203 based on the received time signals. In some embodiments, the time intervals are varied based on the duration of the user's interaction with the screen 202. In an embodiment, the processor 212 may increase the time intervals as the duration of the user's interaction with the screen 202 approaches a predefined threshold. The predefined threshold may be a maximum time duration that the user is allowed to interact with the screen 202 while driving.

In an embodiment, the processor 212 may also execute the computer-readable instructions to generate an audio alert upon determining that the user is interacting with the screen 202 while driving the vehicle. In some embodiments, the processor 212 may generate a continuous audio alert signal indicative of the user's interaction with the screen 202. In one embodiment, the processor 212 may vary a pitch and an amplitude associated with the sound alert as the duration of interaction approaches the predefined threshold. For example, the processor 212 may gradually increase the pitch and/or the amplitude of the sound alert as the duration of interaction approaches the predefined threshold.

In an embodiment, the processor 212 may activate a mode on the computer-based device 200 based on the time duration of the user's interaction with the screen 20 while driving. The mode may include a count mode, and optionally at least one of a lock mode and a freeze mode. During the count mode, the processor 212 may continue displaying the timer on the screen 202 while the user "A" interacts with the screen 202.

During the lock mode, the processor 212 may lock the screen 202 to prevent the user from interacting with the screen 202. In some embodiments, the processor 212 may unlock the screen upon determining that the vehicle has stopped moving. Further, during the lock mode, the processor 212 may allow the user to access to at least one of a navigation feature, an emergency call feature or an emergency texting feature of the computer-based device 200. In some other embodiments, the processor 212 may unlock the screen 202 upon receiving an override input from the user. In an embodiment, the override input may in the form of an audio signal or a gesture.

Figure 3A:
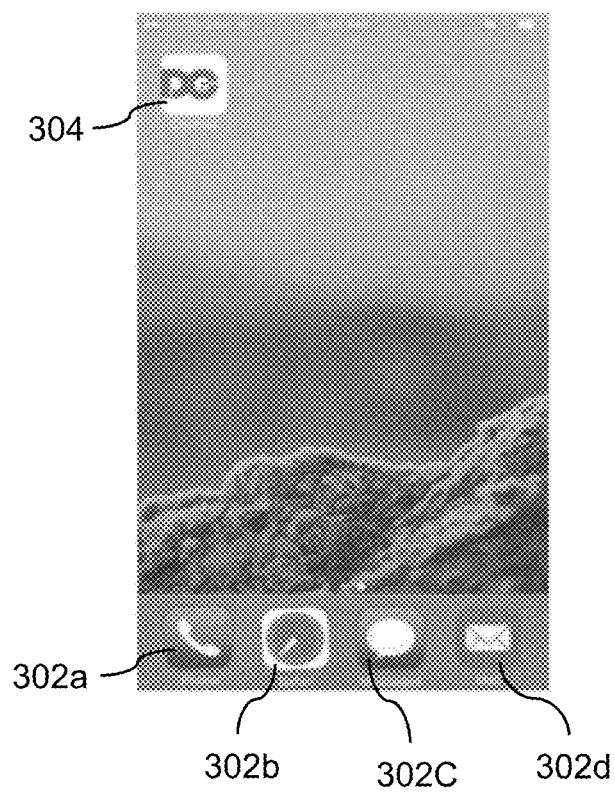

FIGS. 3A-3I illustrate various views of the user interface 203 displayed on the screen 202 of the computer-based device 200 (shown in FIG. 2) in accordance with the disclosed subject matter. The user interface 203 includes a plurality of selectable displayed application pages. A user of the computer-based device 200 may select the displayed application page that is to be displayed on the screen 202. FIG. 3A illustrates a home page 300 of the user interface 203. The home page 300 includes a plurality of icons 302a-302d. Each of the plurality of icons 302a-302d may be associated with a corresponding application. Example of such an application includes, but not limited to, a calling application, an internet browser, a messaging application, an email application and so forth. In an exemplary embodiment, the home page 300 also includes an icon 304 corresponding to the application 206 (shown in FIG. 2) stored in the memory 204. The icon 304 may allow the user to access the application 206. In some embodiments, the icon 304 is displayed at the top left corner of the home page 300. In some other embodiments, the processor 212 may receive an input from a user to change the position of the icon 304. In an embodiment, the user may use a drag and drop action on a touch sensitive layer of the screen 202 to change the position of the icon 304. In alternative embodiments, the processor 212 may automatically change the position of the icon 304. In an exemplary embodiment, the user may select the icon 304 to access the application 206.

Figure 3B:
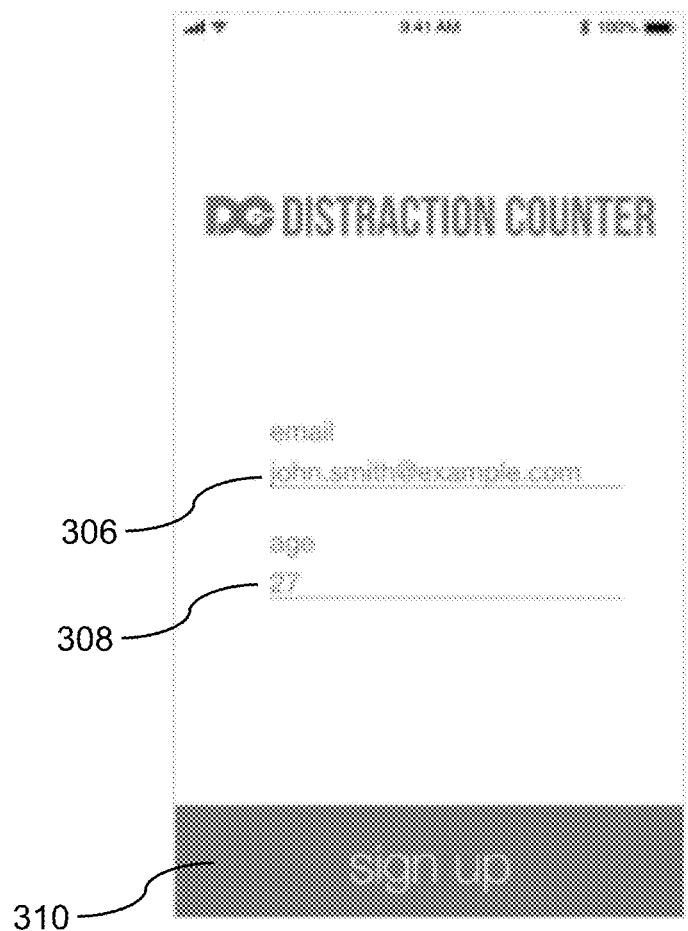
Figure 3E:
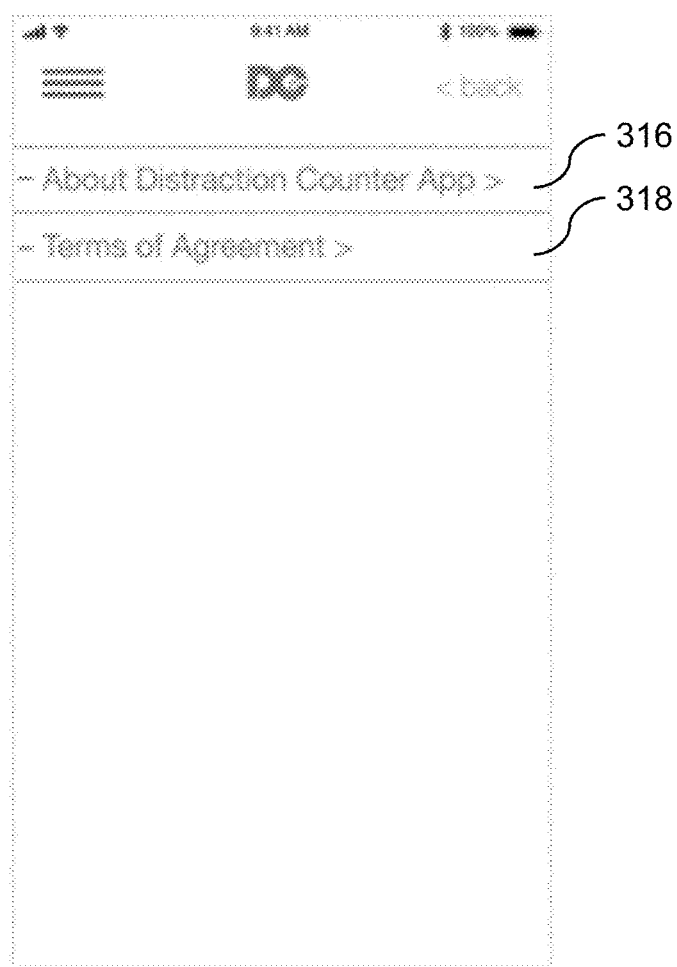

FIG. 3B illustrates a first page 301 of the user interface 203. In some embodiments, the processor 212 may re-direct a user from the home page 300 to the first page 301 upon receiving a selection of the icon 304. In some embodiments, the processor 212 may execute the computer-readable instructions of the application 206 to generate the first page 301 of the user interface 203. In some embodiments, the user interface 203 is a web based interface that can communicate with the server 106 (as shown in FIG. 1). In an exemplary embodiment, the first page 301 may receive profile information of a user. The first page 301 may include user identification fields such as, but not limited to, an email field 306 and an age field 308. In some embodiments, each of the email field 306 and the age field 308 can be, but not limited to, a text box. In an embodiment, the user may enter his/her email address in the email field 306 via the computer-based device 200. In some embodiments, the processor 212 may retrieve identification information of the user using the email address provided by the user at the first page 301. The user may enter his/her age in the age field 308. In some embodiments, the processor 212 may determine whether the user of the computer-based device 200 is eligible to drive a vehicle based on the age of the user. In some embodiments, the first page 301 may include additional informational fields such as, a username field, a password field, an address field, and so forth. In some embodiments, the first page 301 may also include a sign-up button 310. The sign-up button 310 may allow the user to store the information provided in the aforementioned fields of the first page 301 in the memory 204. In some embodiments, the processor 212 may store the information provided in the aforementioned fields in the memory 204 upon determining a selection of the sign-up button 310. In some embodiments, the processor 212 may transmit the information provided in the aforementioned fields to the server 106.

FIGS. 3C and 3D illustrate various views of a status page 303 of the user interface 203. In an exemplary embodiment, the processor 212 may redirect the user to the status page 303 from the first page 301 after successful submission of the user identification information. In some other embodiments, the identification information corresponding to a user may be previously stored in the memory 204 and the processor 212 may redirect the user to the status page 303 from the home page 300 upon selection or actuation of the icon 304 by the user. For example, the user may tap the icon 304 to access the status page 303. The status page 303 may include an output field 312. In an exemplary embodiment, the output field 312 may indicate a status of the application. The status of the application may be indicative of the user's interaction with the screen 202 while driving a vehicle. In one embodiment, the processor 212 may provide a status of the application as "DISENGAGED" (as shown in FIG. 3C) on the output field 312, in case the user is not interacting with the screen 202 or the vehicle is not moving. In some other embodiments, the processor 212 may provide a status of the application as "ENGAGED" (as shown in FIG. 3D) upon determining that the user is driving a vehicle or the user is interacting with the screen 202 while driving. The status page 303 may also include a menu button 314 configured to redirect the user to an information page 305 illustrated in FIG. 3E.

The information page 305 includes a first hyperlink 316 and a second hyperlink 318. In an exemplary embodiment, the first hyperlink 316 may include a header "About Distraction Counter App". The second hyperlink 318 may include a header "Terms of Agreement". The first hyperlink 316 may display information about the operation of the application 206. In some embodiments, the processor 212 may display the information about the application 206 upon selection of the first hyperlink 316 by the user. The information displayed upon selection of the first hyperlink 316 may assist the user in understanding the working and use of the application 206. In one embodiment, the selection of the first hyperlink 316 may display the information on the information page 305 by enabling a toggle down display. In another embodiment, the selection of the first hyperlink 316 may redirect the user to another page to display the information. The processor 212 may display all the terms and conditions for using the application 206 upon selection of the second hyperlink 318 by the user. In some embodiments, the processor 212 may display information regarding license requirements for using the application 206 upon selection of the second hyperlink 318. In one embodiment, the selection of the second hyperlink 318 may display the information on the information page 305 by enabling a toggle down display. In another embodiment, the selection of the second hyperlink 318 may redirect the user to another page to display the information. In some embodiments, the user may select any of the first or the second hyperlinks 316, 318 by performing an action on the screen 202 such as, but not limited to, tapping.

In some embodiments, the processor 212, upon determining that the user is interacting with the screen 202 while driving a vehicle, may generate a timer on the user interface 203. FIGS. 3F-3I illustrate various views of a timer 322 displayed on the user interface 203. The timer 322 may be a counter that counts a duration of the user's interaction with the screen 202. The timer 322 may be a whole number or a decimal number or other format. When the vehicle is in motion and the user simultaneously interacts with the computer-based device 200 while driving, the timer 322 is incremented by a series of whole numbers or decimal numbers. The timer 322 informs the user about the duration of the user's interaction with the screen 202. Specifically, the timer 322 informs the user about how much time the user's attention and/or view is averted from a road. Therefore, the timer 322 may remind, alert and encourage the user to focus his or her attention and vision to safely operate the vehicle while driving.

Figure 3F:
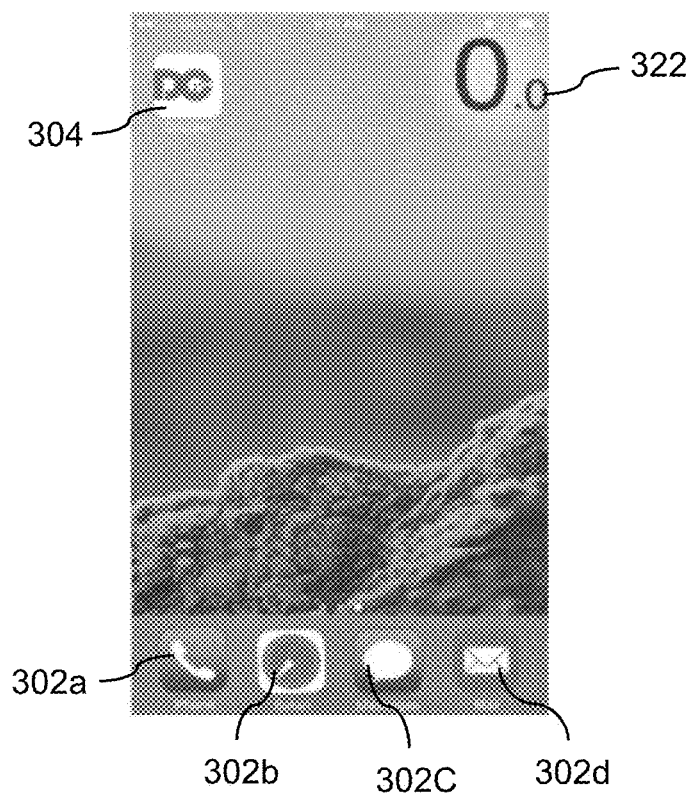

In some embodiments, the processor 212, upon determining that the user is interacting with the screen 202 while driving a vehicle, may change the status of the application 206 to "ENGAGED" (as shown in FIG. 3D). In an alternative embodiment, the processor 212 may change the status of the application 206 to "ENGAGED" upon determining the user is driving the vehicle. In some embodiments, the processor 212 may display a splash screen on the user interface 203. The splash screen may be a temporarily displayed screen that indicates the status of application 206 as "ENGAGED". In an embodiment, the splash screen may be the status page 303, as illustrated in FIG. 3D. As illustrated in FIG. 3F, the processor 212 may display the timer 322 on the home page 300 of the user interface 203. In an exemplary embodiment, the timer 322 is indicative of a timer duration of the user's interaction with the screen 202 while driving. In some embodiments, the processor 212 may receive time signals from the timing circuit 210 at varying time intervals and change the timer 322 based on the received time signals. As shown in FIG. 3F, the timer 322 is overlaid on a top right corner of the home page 300. In an embodiment, the timer 322 may be a persistent overlay that allows the user to view and access a portion of the home page 300 that is overlaid by the timer 322. Specifically, the user can perform one or more operations on the portion of the home page 300 overlaid by the timer 322. Such operations may include, but not limited to, tapping, swiping, pinching, and so forth.

Figure 3G:
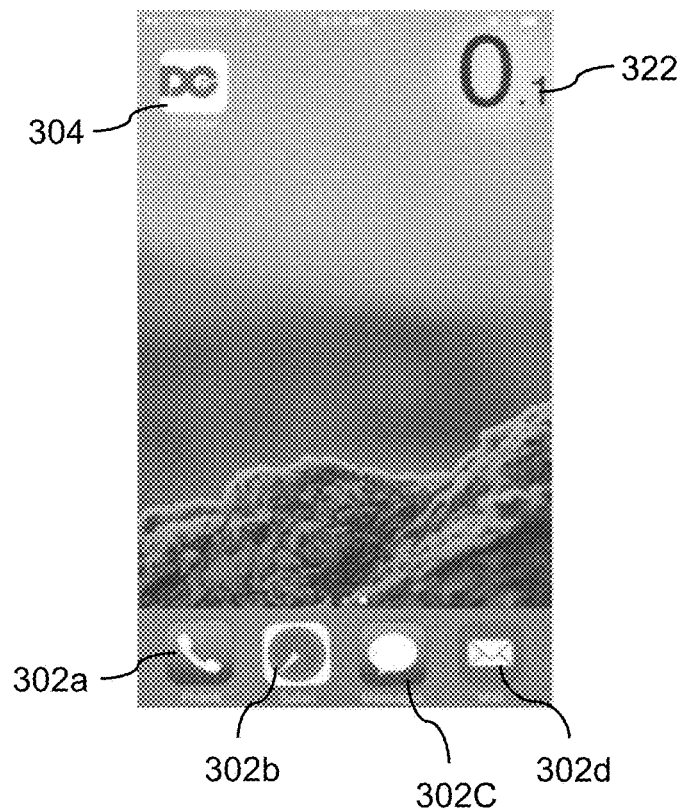
Figure 3H:
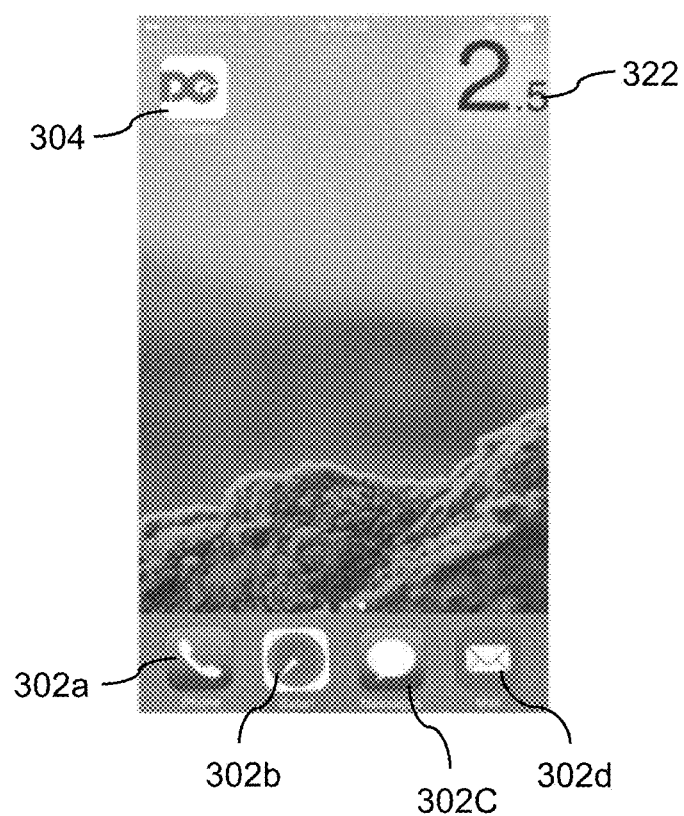

As illustrated in FIG. 3G, the processor 212 may receive the time signals from the timing circuit 210 at an interval of 0.1 second, and the timer 322 is changed or updated accordingly. Further, as illustrated in FIG. 3H, the processor 212 may receive the time signals at an interval of 0.5 second and the timer 322 is changed accordingly. In some embodiments, the processor 212 may vary the interval of receiving the time signals from the timing circuit 210 based on the duration of the interaction of the user with the screen 202. In one embodiment, the processor 212 may increase the interval of receiving the time signals after the user has interacted with the screen 202 for a predetermined time duration. In some embodiments, the processor 212 may change the interval of receiving the time signals in order the notify the user that the duration of interaction has exceeded or about to exceed a predefined threshold.

In an exemplary embodiment, the processor 212 displays the timer 322 as a persistent overlay on each of the one or more selectable pages of the user interface 203. In some embodiments, the processor 212 may allow the user to select one of the selectable pages by performing an operation on the screen 202. Such operations may include, but not limited to, swiping, tapping, and so forth. The timer 322 may be persistently overlaid on each of the selectable pages. For example, if a user switches from a home page to a widget page, the timer 322 remains persistently displayed on the screen 202. Further, the widget page may include one or more widgets. In some embodiments, the timer 322 may overlay at least one of the widgets displayed on the widget page.

Figure 3I:
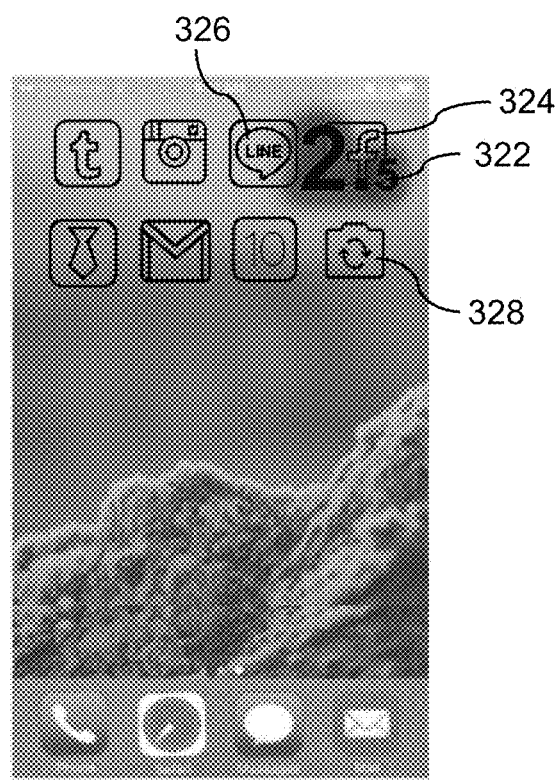

In some embodiments, the timer 322 may be overlaid on at least one visual element on each of the selectable displayed application pages. As illustrated in FIG. 3I, the timer 322 may be persistently displayed on an application page 307. The application page 307 may include a plurality of icons to allow the user to access a corresponding application. The icons include an icon 324, an icon 326 and the icon 328. In an exemplary embodiment, the timer 322 may overlay the icon 324 at a top right corner. In some embodiments, the icon 324, overlaid by the timer 322, remains viewable and accessible by the user of the computer-based device 200. In another embodiment, the icon 324, overlaid by the timer 322, is at least partially visible to the user. The processor 212 may allow the user to select the icon 324 by any selection methods such as, but not limited to, tapping, clicking and so forth. In some embodiments, the processor 212 may allow the user to tap on the timer 322 to select the icon 324 and access the corresponding application. Further, the visibility of the icon 324 may depend on a display size and a display transparency of the timer 322.

In alternative embodiments, the processor 212 may vary the display size of the timer 322 based on the one or more visual elements displayed on the user interface 203. In some embodiments, the processor 212 may allow the user to vary the display size of the timer 322 via an input device (not shown). The input device may include a mouse, a joystick, a keyboard, a touch sensitive layer and so forth. In some embodiments, the processor 212 may vary the display transparency of the timer 322 based on the one or more visual elements displayed on the user interface 203. In some embodiments, the processor 212 may allow the user to vary the display size of the timer 322 via the input device.

Figure 4:
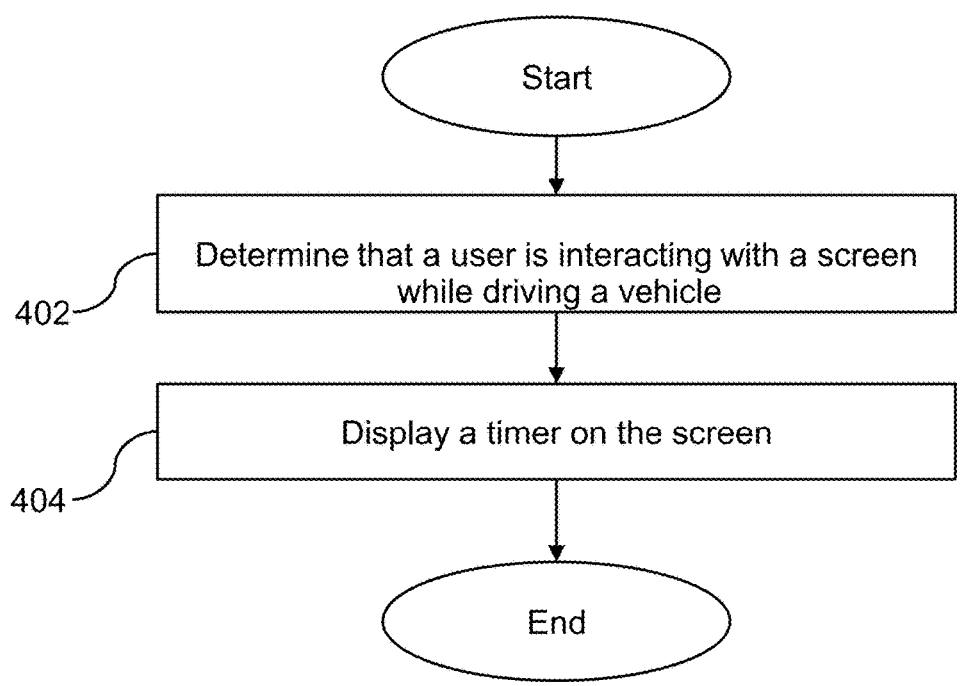
FIG. 4 is a flowchart of an exemplary method for monitoring a user's interaction with a computer-based device.

FIG. 4 illustrates a method 400 for monitoring driver distraction in accordance with the disclosed subject matter. Reference will also be made to FIGS. 1, 2, and 3A-3I.

At step 402, the method 400 includes determining that a user of the computer-based device 200 is interacting with a screen 202 while driving a vehicle. In some embodiments, the processor 212 may execute the computer-readable instructions stored in the memory 204 to determine that the user of the computer-based device 200 is interacting with the screen 202 while driving the vehicle. The processor 212 may determine that the user is interacting with the screen 202 while driving based on input signals received from the one or more sensors 208. In an exemplary embodiment, the processor 212 may receive input signals from a camera, a positioning sensor (e.g., a GPS sensor), and/or a Bluetooth™ device to determine that the user is interacting with the screen 202 while driving the vehicle. In some other embodiments, the processor 212 may detect various applications running on the computer-based device 200 to determine that the user is interacting with the screen 202 driving a vehicle. In alternative embodiments, the processor 212 may determine that a user of the computer-based device 200 is driving a vehicle based on data signals received from an external system (e.g., a car manufacturer, another vehicle, a traffic monitoring system etc.). In one embodiment, the processor 212 may combine the input signals received from the one or more sensors 208 to determine a status of the vehicle, a status of the user, and a probability that the user is driving the vehicle. In an embodiment, the processor 212 may determine that the user is driving the vehicle if the probability exceeds a predetermined threshold. The probability may increase if two or more of the sensors 208 indicate that the user is driving the vehicle.

Next at step 404, the processor 212 may display the timer 322 on the user interface 203, displayed by the screen 202, upon determining that the user is interacting with the screen 202 while driving the vehicle. In some embodiments, the timer 322 may be indicative of a time duration of the user's interaction with the screen 202 of the computer-based device 200. As illustrated in FIGS. 3F-3I, the timer 322 is displayed as a persistent overlay over one or more selectable displayed application pages. In some embodiments, the timer 322 may overlay at least one visual element of each selectable page. In an exemplary embodiment, the icon 324, that is overlaid by the timer 322, remains viewable and accessible by the user. Specifically, the user can view the icon 324 as well as select the icon 324 to access the corresponding application.

In some embodiments, the processor 212 may vary a display size of the timer 322 based on the one or more visual elements displayed on the user interface 203. In alternative embodiments, the processor 212 may receive an input from the user to change the display size of the timer 322. In an embodiment, the user may provide the input to the processor 212 via an input device (not shown) such as, but not limited to, a mouse, a button, a microphone, a camera, and the touch sensitive layer of the screen 202.

In some embodiments, the processor 212 may vary a display transparency of the timer 322 based on the one or more visual elements displayed on the user interface 203. In some other embodiments, the processor 212 may vary the display transparency based on a brightness value of the screen 202. In some other embodiments, the processor 212 may receive an input from a user to change the display transparency of the timer 322.

In some embodiments, the processor 212 may reset and hide the timer 322 upon determining that the vehicle has stopped moving. In some embodiments, the processor 212 may determine that the vehicle has stopped moving based on signals receive from the control unit 108 (shown in FIG. 1). In some embodiments, the processor 212 may reset and the timer 322 upon determining that the user has stopped interacting with the screen 202 for a predefined time duration.

In some embodiments, the processor 212 may receive time signals from the timing circuit 210 to display and update the timer 322 on the user interface 203 of the screen 202. In an embodiment, the processor 212 may receive the time signals from the timing circuit 210 at varying time intervals. The processor 212 may change the timer 322 displayed on the user interface 203 based on the received time signals. As illustrated in FIGS. 3B and 3C, the time intervals are varied based on the duration of the user's interaction with the screen 202.

In an embodiment, the processor 212 may also execute the computer-readable instructions to generate an audio alert upon determining that the user is interacting with the screen 202 while driving the vehicle.

Figure 5:
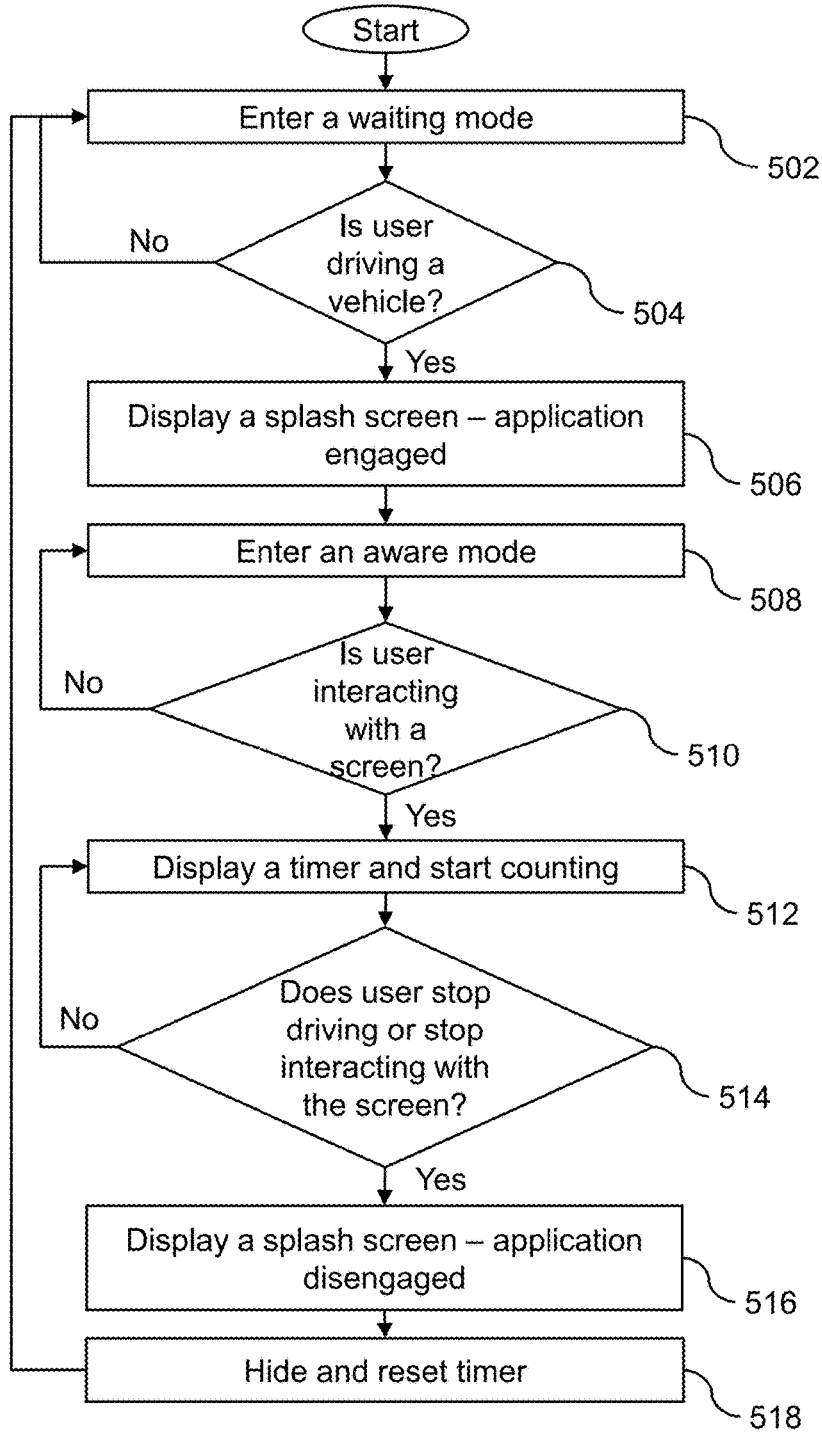
FIG. 5 is a flowchart of another exemplary method for monitoring a user's interaction with a computer-based device.

FIG. 5 illustrates a method 500 for monitoring driver distraction in accordance with the disclosed subject matter. Reference will also be made to FIGS. 2, and 3A-3I. The different steps of the method 500 may be performed by the processor 212 upon execution of the computer-readable instructions of the application 206.

At step 502, the application 206 may enter a waiting mode. During the waiting mode, the application 206 may run as a service which remains active in background. In the waiting mode, the application 206 may consume less power, thereby helping conserve power of the energy source (e.g., a battery) of the computer-based device 200. During the waiting mode, the application 206 may cause the processor 212 to periodically poll the one or more sensors 208 to receive input signals. The time interval of polling may be suitably chosen to conserver power. Further, the sensors 208 used during the waiting mode may be low power sensors.

At step 504, the processor 212 may determine that the user is driving the vehicle based on the input signals received from the one or more sensors 208. In an embodiment, the processor 212 may first determine that the user is in a moving vehicle. Subsequently, the processor 212 may determine that the user is driving the vehicle. In an embodiment, the processor 212 may use a GPS sensor and/or a motion sensor of the computer-based device 200 to determine that the vehicle is moving. Further, the processor 212 may use input signals from a camera of the computer-based device 200 and/or signals from a seat occupation sensor of the vehicle to determine that the user is driving the vehicle. The application 206 continues to operate in the waiting mode if the vehicle is not moving, or the user is not driving the vehicle.

At step 506, the processor 212 may display a splash screen on the user interface 203 upon determining that the user is driving the vehicle. The splash screen may indicate that the application 206 is engaged. In an embodiment, the processor 212 may display the status page 303, as illustrated in FIG. 3D, indicating the status of the application 206 as "ENGAGED". In some embodiments, the processor 212 may display the splash screen for two to five seconds.

Next at step 508, the application 206 may enter an aware mode upon determining that the user is driving the vehicle. During the aware mode, the processor 212 may receive input signals from the one or more sensors 208 to check whether the user is interacting with the screen 202. If at step 510, the application 206 determines that the user is interacting with the screen 202 while driving, control moves to step 512. Otherwise, the application 206 may continue to operate in the aware mode.

At step 512, the application 206 may enter a count mode. During the count mode, a timer or counter (e.g., the timer 322) is displayed on the screen 202. The processor 212 increments the timer 322 based on the duration of the user's interaction with the screen while driving. In some embodiments, the processor 212 may receive time signals from the timing circuit 210 to display and update the timer 322 on the user interface 203 of the screen 202. The timing circuit 210 may therefore enable the application 206 to count the duration of the user's interaction with the screen 202. In an embodiment, the processor 212 may receive the time signals from the timing circuit 210 at varying time intervals. Therefore, the timer 322 is also updated or changed at varying time intervals.

As illustrated in FIGS. 3F-3I, the timer 322 is displayed as a persistent overlay over one or more selectable displayed application pages. In some embodiments, the timer 322 may overlay at least one visual element of each selectable page. For example, referring to FIGS. 3F and 3I, the timer 322 is persistently displayed on the home page 300 as well as the application page 307. Therefore, the user can view the timer 322 even if he or she navigates between the home page 300 and the application page 307. In an exemplary embodiment, the icon 324, that is overlaid by the timer 322, remains viewable and accessible by the user. Specifically, the user can view the icon 324 as well as select the icon 324 to access the corresponding application.

Therefore, the method 500 may enable the computer-based device 200 to alert the user that he or she is distracted while driving, yet allowing the user to access various functionalities of the computer-based device 200. For example, the user can access the applications or services of the computer-based device 200, such as navigation, calling and texting, while the timer 322 is persistently displayed on the screen 202.

Next at step 514, the application 206 may check whether the user has stopped driving the vehicle or stopped interacting with the screen for a predefined time duration. The predefined time duration may be about 10 seconds. In some embodiments, the predefined time duration may be selected by the user or the remote server 106 (shown in FIG. 1). If the application 206 determines that the user has stopped driving the vehicle or stopped interacting with the screen for the predefined time duration, control moves to step 516. Otherwise, the application 206 may continue in the count mode during which the timer 322 is updated based on the duration of the user's interaction with the screen 202 while driving.

At step 516, the processor 212 may display a splash screen on the user interface 203 indicating that the application 206 is disengaged. In an embodiment, the processor 212 may display the status page 303, as illustrated in FIG. 3C, indicating the status of the application 206 as "DISENGAGED". In some embodiments, the processor 212 may display the splash screen for two to five seconds.

Further, at step 518, the application 206 may hide and reset the timer 322. Further, control moves to step 502, where the application 206 switches to the waiting mode. The timer 322 is therefore no longer displayed on the user interface 203.

Figure 6:
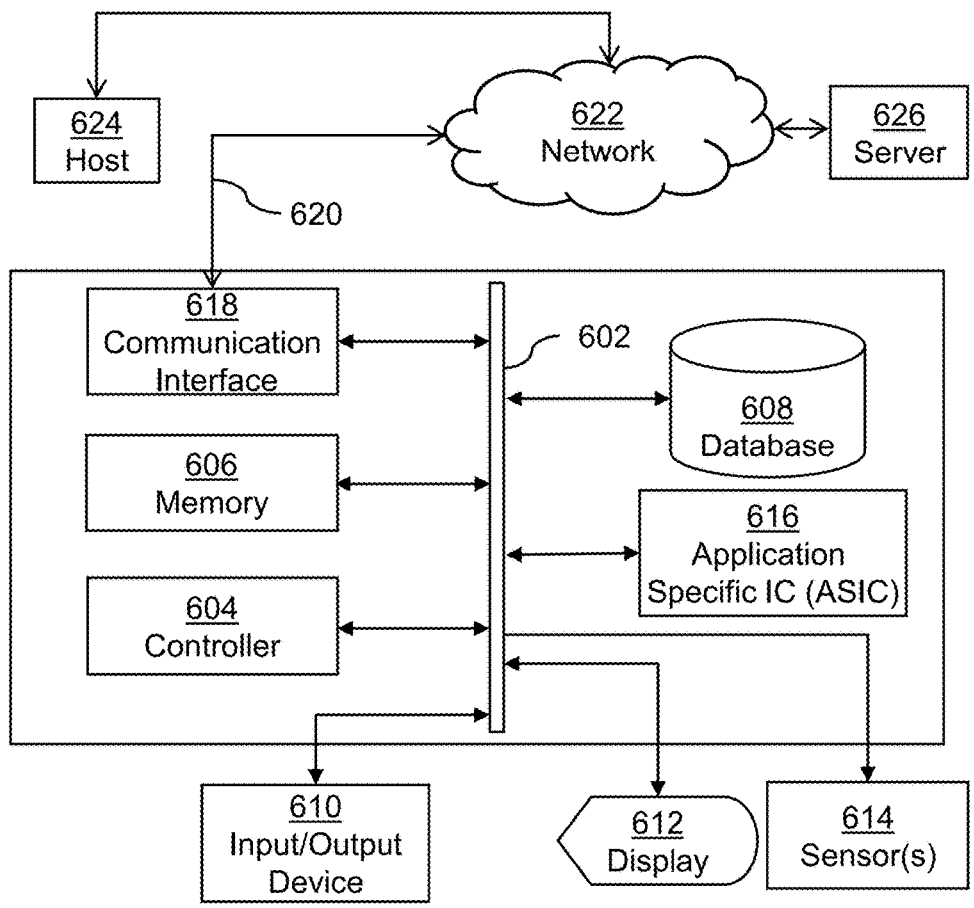
FIG. 6 is a computer system that can be used to implement various exemplary embodiments of the disclosed subject matter.

FIG. 6 illustrates a computer system 600 upon which the operation of the computer-based device 200 and/or the remote server 106 may be implemented. Although, the computer system 600 is depicted with respect to a particular device or equipment, it is contemplated that other devices or equipment (e.g., network elements, servers, etc.) within FIG. 6 can deploy the illustrated hardware and components of system. The computer system 600 is programmed (e.g., via computer program code or instructions) to receive input signals from the one or more sensors 208 and to display the retrieved data on the user interface 203. The computer system 600 includes a communication mechanism such as a bus 602 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 602 includes one or more parallel conductors of information so that information is transferred quickly among devices coupled to the bus 602. A processor 604 for processing information are coupled with the bus 602.

The processor 604 performs a set of operations on information as specified by an end-user. The computer program code is a set of instructions or statements providing instructions for the operation of the processor 604 and/or the computer system 600 to perform specified functions. The code, for example, may be written in a computer programming language that is compiled into a native instruction set of the processor 604. The code may also be written directly using the native instruction set (e.g., machine language). The set of operations include bringing information in from the bus 602 and placing information on the bus 602. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 604, such as a sequence of operation codes, constitute processor instructions, also called computer system instructions or, simply, computer instructions. The processor 604 may be implemented as mechanical, electrical, magnetic, optical, chemical, or quantum components, among others, alone or in combination.

The computer system 600 also includes a memory 606 coupled to the bus 602. The memory 606, such as a RAM or any other dynamic storage device, stores information including processor instructions for storing information and instructions to be executed by the processor 604. The dynamic memory 606 allows information stored therein to be changed by the computer system 600. RAM allows a unit of information stored at a location called a memory address to be stored and retrieved independently of information at neighboring addresses. The memory 606 is also used by the processor 604 to store temporary values during execution of processor instructions. The computer system 600 also includes a Read Only Memory (ROM) or any other static storage device coupled to the bus 602 for storing static information, including instructions, that is not changed by the computer system 600. Some memory is composed of volatile storage that loses the information stored thereon when power is lost. Also coupled to the bus 602 is a non-volatile (persistent) storage device 608, such as a magnetic disk, a solid state disk, optical disk or flash card, for storing information, including instructions, that persists even when the computer system 600 is turned off or otherwise loses power.

Information, including instructions for processing the preconfigured data collection is provided to the bus 602 for use by the processor 604 from an external input device 610, such as a keyboard containing alphanumeric keys operated by a human user, a microphone, an Infrared (IR) remote control, a joystick, a game pad, a stylus pen, a touch screen, or a sensor. The sensor detects conditions in its vicinity and transforms those detections into physical expression compatible with the measurable phenomenon used to represent information in the computer system 600. Other external devices coupled to the bus 602, used primarily for interacting with humans, include a display 612, such as a Cathode Ray Tube (CRT), a Liquid Crystal Display (LCD), a Light Emitting Diode (LED) display, an organic LED (OLED) display, active matrix display, Electrophoretic Display (EPD), a plasma screen, or a printer for presenting text or images, and a pointing device, such as a mouse, a trackball, cursor direction keys, or a motion sensor, for controlling a position of a small cursor image presented on the display 612 and issuing commands associated with graphical elements presented on the display 612, and one or more camera sensors 614 for capturing, recording and causing to store one or more still and/or moving images (e.g., videos, movies, etc.) which also may comprise audio recordings. Further, the display 612 may be a touch enabled display such as capacitive or resistive screen. In some embodiments, for example, in embodiments in which the computer system 600 performs all functions automatically without human input, one or more of the external input device 610, and the display 612 may be omitted.

In the illustrated embodiment, special purpose hardware, such as an ASIC 616, is coupled to the bus 602. The special purpose hardware is configured to perform operations not performed by the processor 604 quickly enough for special purposes. Examples of ASICs include graphics accelerator cards for generating images for the display 612, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

The computer system 600 also includes one or more instances of a communication interface 618 coupled to the bus 602. The communication interface 618 provides a one-way or two-way communication coupling to a variety of external devices that operate with their own processors, such as printers, scanners and external disks. In general, the coupling is with a network link 620 that is connected to a local network 622 to which a variety of external devices with their own processors are connected. For example, the communication interface 618 may be a parallel port or a serial port or a Universal Serial Bus (USB) port on a personal computer. In some embodiments, the communication interface 618 is an Integrated Services Digital Network (ISDN)

card, a Digital Subscriber Line (DSL) card, or a telephone modem that provides an information communication connection to a corresponding type of a telephone line. In some embodiments, the communication interface 618 is a cable modem that converts signals on the bus 602 into signals for a communication connection over a coaxial cable or into optical signals for a communication connection over a fiber optic cable. As another example, the communications interface 618 may be a Local Area Network (LAN) card to provide a data communication connection to a compatible LAN, such as Ethernet™ or an Asynchronous Transfer Mode (ATM) network. In one embodiment, wireless links may also be implemented. For wireless links, the communication interface 618 sends or receives or both sends and receives electrical, acoustic or electromagnetic signals, including infrared and optical signals that carry information streams, such as digital data. For example, in wireless handheld devices, such as mobile telephones like cell phones, the communication interface 618 includes a radio band electromagnetic transmitter and receiver called a radio transceiver. In certain embodiments, the communication interface 618 enables connection to the network 618 for processing the preconfigured data collection associated with the campaign. Further, the communication interface 618 can include peripheral interface devices, such as a thunderbolt interface, a Personal Computer Memory Card International Association (PCMCIA) interface, etc. Although a single communication interface 618 is depicted, multiple communication interfaces can also be employed.

The term "computer-readable medium" as used herein refers to any medium that participates in providing information to the processor 604, including instructions for execution. Such a medium may take many forms, including, but not limited to, computer-readable storage medium (e.g., non-volatile media, volatile media), and transmission media. Non-transitory media, such as non-volatile media, include, for example, optical or magnetic disks, such as the storage device 608. Volatile media include, for example, the dynamic memory 606. Transmission media include, for example, twisted pair cables, coaxial cables, copper wire, fiber optic cables, and carrier waves that travel through space without wires or cables, such as acoustic waves, optical or electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a USB flash drive, a Blu-ray disk, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 616.

The network link 620 typically provides information communication using transmission media through one or more networks to other devices that use or process the information. For example, the network link 620 may provide a connection through the local network 622 to a host computer 624 or to ISP equipment operated by an Internet Service Provider (ISP).

A computer called a server 626, connected to the Internet, hosts a process that provides a service in response to information received over the Internet. For example, the server 626 hosts a process that provides information representing video data for presentation at the display 612. It is contemplated that the components of the computer system 600 can be deployed in various configurations within other computer systems, e.g., the host 624 and the server 626.

At least some embodiments of the invention are related to the use of the computer system 600 for implementing some or all of the techniques described herein. According to one embodiment of the invention, those techniques are performed by the computer system 600 in response to the processor 604 executing one or more sequences of one or more processor instructions contained in the memory 606. Such instructions, also called computer instructions, software and program code, may be read into the memory 606 from another computer-readable medium such as the storage device 608 or the network link 620. Execution of the sequences of instructions contained in the memory 606 causes the processor 604 to perform one or more of the method steps described herein. In alternative embodiments, hardware, such as the ASIC 616, may be used in place of or in combination with software to implement the invention. Thus, embodiments of the invention are not limited to any specific combination of hardware and software, unless otherwise explicitly stated herein.

While certain embodiments of the invention are described above, and FIGS. 1-6 disclose the best mode for practicing the various inventive aspects, it should be understood that the invention can be embodied and configured in many different ways without departing from the spirit and scope of the disclosure.

For example, embodiments are disclosed above in the context of facilitating a purchase of an item. Embodiments, as disclosed above, are directed to systems and methods to facilitate sale and purchase of items at discounted prices to an end-user. Specifically, one or more delivery devices, such as discount cards or coupons, are generated and distributed to the end-users to increase usage or sale of an item. End-users are also enabled to access information regarding the purchase of various items by a single registration step. Further, end-users can purchase items at discounted prices in the absence of prior history of transactions from any or a combination of the sellers, the facility providers, and/or the distribution entities.

Embodiments, as disclosed above, are directed to systems and methods to provide profit for the seller of the item, the provider of the delivery device and/or the distributor of the delivery device based on an unused discount value present on the delivery device.

Embodiments, as disclosed above, are directed toward a single platform for multiple sellers to offer the sale of multiple items and for the end-users to make one or more purchases from the sellers.

In some embodiments, the stored value on the delivery device can be replenished or recharged when the stored value falls below a minimum threshold value or is null. The stored value can be recharged through additional purchases or through various reward programs offered by the facility providers, the distribution entities and/or the sellers.

In other embodiments, the delivery device may be a physical card or any portable device that includes a magnetic strip, a biometric chip, an RFID (Radio Frequency Identification) tag, or other types of Near Field Communication (NFC) chip, for enabling unique identification of the delivery device and facilitating transactions at various points-of-sale terminals.

Exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary embodiments disclosed above.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, ColdFusion or other sufficient programming languages.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A method for monitoring driver distraction executed by a processor comprising:
   determining, by using one or more sensors, that a driver, of a computer-based device, is interacting with a screen of the computer-based device while driving a vehicle, wherein the screen is configured to display a user interface including one or more selectable displayed application pages, each of the one or more selectable displayed application pages displaying one or more visual elements; and
   displaying a timer by the processor, as a persistent overlay, on at least a portion of each of the one or more selectable displayed application pages, the timer being indicative of a time duration of the driver's interaction with the screen while driving, wherein at least one of the visual elements, overlaid by the timer, remains viewable and accessible by the driver of the computer-based device.

2. The method of claim 1, further comprising resetting and hiding the timer upon determining at least one of the following:
   the vehicle has stopped moving; and
   the driver has stopped interacting with the screen for a predefined time duration.

3. The method of claim 1, further comprising transmitting driver data to one or more remote servers, wherein the driver data is indicative of at least the time duration of the driver's interaction with the screen while driving.

4. The method of claim 1, further comprises generating an audio alert on determining that the driver is interacting with the screen while driving.

5. The method of claim 1, further comprising varying a display size of the timer based on the one or more visual elements displayed on the user interface.

6. The method of claim 1, further comprises adjusting a display transparency of the timer based on the one or more visual elements displayed on the user interface.

7. The method of claim 1, further comprising:
   receiving time signals from a timing circuit at varying time intervals; and
   changing the timer displayed on the user interface based on the received time signals, wherein the time intervals are varied based on the duration of the driver's interaction with the screen while driving.

8. The method of claim 1, wherein the one or more sensors include a magnetometer and GPS, gyroscope, accelerometer, proximity, sensor, barometer, ambient light sensor, microphone, multiple cameras, temperature, wifi, Bluetooth, a camera, an orientation sensor, a proximity sensor, a touch sensitive layer or a position sensor.

9. A method for monitoring driver distraction comprising:
   providing an application for installation on a computer-based device including a screen and a processor, wherein the screen is configured to display a user interface including one or more selectable displayed application pages, each of the one or more selectable displayed application pages displaying one or more visual elements, and wherein the application includes computer-readable instructions, which upon execution, cause the processor to:
      determine, by using one or more sensors, that a driver, of the computer-based device, is interacting with the screen while driving a vehicle; and
      display a timer, as a persistent overlay, on at least a portion of each of the one or more selectable displayed application pages, the timer being indicative of a time duration of the driver's interaction with the screen while driving, wherein at least one of the visual elements, overlaid by the timer, remains viewable and accessible by the driver of the computer-based device.

10. The method of claim 9, wherein the computer-readable instructions, upon execution, further cause the processor to:
    reset and hide the timer upon determining at least one of the following:
    the vehicle has stopped moving; and
    the driver is not interacting with the screen for a predefined time duration.

11. The method of claim 9, wherein the computer-readable instructions, upon execution, further cause the processor to:
    transmit driver data to one or more remote servers, wherein the driver data is indicative of at least the time duration of the driver's interaction with the screen.

12. The method of claim 9, wherein the computer-readable instructions, upon execution, further cause the processor to:
    generate an audio alert on determining that the driver is interacting with the screen while driving.

13. The method of claim 9, wherein the computer-readable instructions, upon execution, further cause the processor to: vary a display size of the timer based on the one or more visual elements displayed on the user interface.

14. The method of claim 9, wherein the computer-readable instructions upon execution, further cause the processor to: adjust a display transparency of the timer based on the one or more visual elements displayed on the user interface.

15. A computer-based device for monitoring driver distraction comprising:
    a screen configured to display a user interface including one or more selectable displayed application pages, each of the one or more selectable displayed application pages displaying one or more visual elements;
    a memory that stores computer-readable instructions; and
    a processor configured to execute the computer-readable instructions to:
    determine, by using one or more sensors, that a driver, of the computer-based device, is interacting with the screen while driving a vehicle; and
    display a timer, as a persistent overlay, on at least a portion of each of the one or more selectable displayed application pages, the timer being indicative of a time duration of the driver's interaction with the screen while driving, wherein at least one of the visual elements, overlaid by the timer, remains viewable and accessible by the driver of the computer-based device.

16. The computer-based device of claim 15, wherein the processor is further configured to: reset and hide the timer upon determining at least one of the following:
    the vehicle has stopped moving; and
    the driver is not interacting with the screen for a predefined time duration.

17. The computer-based device of claim 15, wherein the processor is further configured to:
    transmit driver data to one or more remote servers, wherein the driver data is at least indicative of the time duration of the driver's interaction with the screen while driving.

18. The computer-based device of claim 15, wherein the processor is further configured to: vary a display size of the timer based the one or more visual elements displayed on the user interface.

19. The computer-based device of claim 15, wherein the processor is further configured to: adjust a display transparency of the timer based the one or more visual elements displayed on the user interface.

20. The computer-based device of claim 15, wherein the processor is further configured to:
    generate an audio alert on determining that the driver is interacting with the screen while driving.

* * * * *